June 24, 1969  C. J. MARCHETTI ET AL  3,451,644
VERTICAL OR SHORT TAKE-OFF AERODYNE OF HIGH TRANSLATION SPEED
Filed March 23, 1966

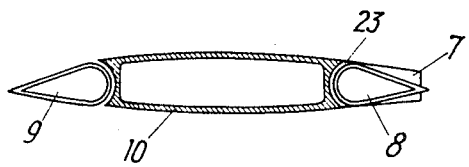
Fig. 3
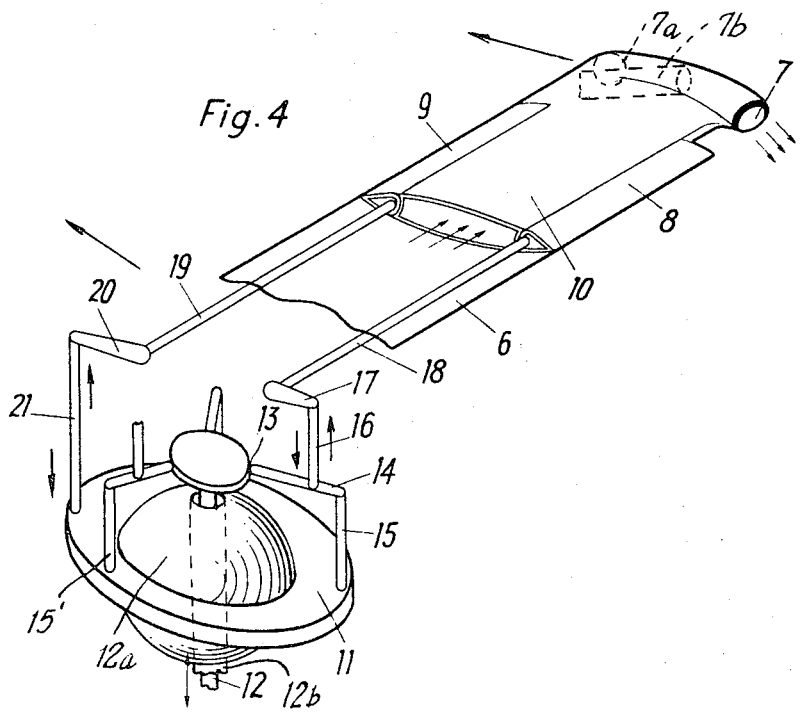
Fig. 4
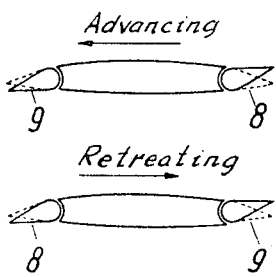
Fig. 5a
Fig. 5b
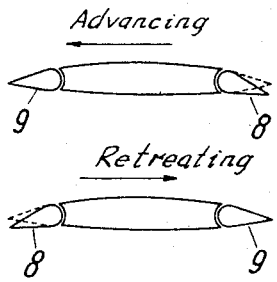
Fig. 6a
Fig. 6b United States Patent Office  3,451,644
Patented June 24, 1969

3,451,644
VERTICAL OR SHORT TAKE-OFF AERODYNE OF HIGH TRANSLATION SPEED
Charles Joseph Marchetti, Neuilly, and Theodor Hugo Laufer, Courbevoie, France, assignors to Societe Charles Marchetti, Paris, France, a corporation of France
Filed Mar. 23, 1966, Ser. No. 536,861
Claims priority, application France, Apr. 8, 1965, 12,421
Int. Cl. B64c 27/24
U.S. Cl. 244—7    4 Claims

ABSTRACT OF THE DISCLOSURE

The aircraft disclosed is of the V.T.O.L. type comprising a fuselage, at least one propulsion unit and a rotor comprising three blades. Each blade has a cross section which is symmetrical with respect to a vertical plane containing the longitudinal axis of said blade, and is provided with identical flaps both at the leading and trailing edge. Means are provided for breaking the rotor to position one blade parallel to the fuselage and the two other blades at 120° thereto to form an arrow type wing, whereby the rotor is used as a helicopter rotor for take-off and as a fixed wing during flights of translation.

Background of the invention

The present invention relates to an aerodyne or an aircraft capable of flying at very high speeds of translation, even supersonic, like an aeroplane with fixed wings, and also capable of taking off and of landing vertically in the manner of a helicopter.

It is known that the helicopter is limited in its speed of translation by several phenomena which principally originate in the rotor. In fact, from a certain speed onwards, the phenomena of disengagement, of compressibility, of the rear attack of the blades, of asymmetry of the aerodynamic loads lead to strains due to vibration, instability phenomena, etc. which most often, do not permit the full speed to be attained from the power available.

To overcome these limitations, various solutions have been proposed, such as multicyclic controls, retractable blades, blades activated by an oscillatory movement superimposed on the rotation etc. The solution most currently advanced consists in relieving the rotor of part of its load, by means of a fixed wing, and of part of its traction, by providing a means of independent traction such as a motorpropulsor, a turbomotor, a turbojet, etc. Nevertheless, all of these solutions only reduce the limit imposed on the speed of translation by the rotor.

A more recent solution, which would consist in stopping the rotor completely relieved and to retract or stream-line it while a fixed wing ensures the translation motion, involves very serious practical complications.

It is an object of the present invention to provide an aerodyne which does not present these drawbacks both as regards the limitation of speed and the practical complications.

According to the present invention there is provided an aerodyne capable of flying at high speeds of translation and capable of vertical landing and take-off, said aerodyne comprising a fuselage, at least one propulsion unit and a rotor, preferably triple bladed arranged so as to be on the one hand capable of being driven in rotation to constitute a rotary wing ensuring at least the take-off of the aerodyne and on the other hand capable of being fixed with respect to the fuselage to constitute a fixed aerofoil contributing to the lift in high speed flight.

Such a rotor is formed of rigid blades having a symmetrical profile with respect to a vertical medial plane through the longitudinal axis of each blade, and provided with flaps respectively at the leading and trailing edges, control of these front and rear flaps enabling all manoeuvres of helicopters and fixed wings aeroplanes to be performed. In addition, braking means are provided to stop the rotor during flight, and locking means to lock the braked rotor to hold it in the correct position whilst flying in the manner of a fixed wing aeroplane.

Such an aerodyne can land and take-off in the manner of a helicopter, the rotor being driven by any convenient means. For example, the rotor can be propelled by jet reaction, the fluid for this purpose being advantageously supplied by the propulsion unit.

If the latter is a double-flow turbojet, compressed air bypassed from the secondary flow can be used to drive the rotor, the primary flow providing a powerful propulsion. In the same way in the case of a turbojet, the hot gases could be used both for turning the rotor by leading them through the passages in blades, and for ensuring the propulsion of the machine.

Above a certain speed, the power is more or less diverted from the rotor. In the preferred example considered below, this power is provided to propulsion unit and furnishes thus thrust for translation. In this range of speed, the rotor works thus in a gyrodyne or propelled autogiro condition.

At the upper limit of the above described second stage, the rotor is braked very rapidly so that the different forms of resonance may be rapidly traversed. The braking means suitable for this purpose can comprise jet deflectors introduced at the exit of the nozzles mounted at the ends of the blades, or preferably nozzles, uncovered at the leading edge of the blades to reverse the thrust. Such a method of braking avoids applying torque to the fuselage, and thus minimizes the complications of piloting. This method of braking uses the fluid which serves for turning the rotor and preferably is assisted by a mechanical friction brake.

The action of the controls is gradually modified in a manner to adapt itself to passage from the helicopter condition in the first stage to the aeroplane condition in the third stage. Once the rotor is stopped by the mechanical brake, it is locked in a position where one blade points forward whilst the other two blades, at 120° thereto, form an arrow type or swept wing. It is then preferable to be able to lock the blade pointing forward, by a retractable or non-retractable support, arranged in the fuselage. In this third stage the aerodyne constitutes an aeroplane since the form of the blades of symmetrical profile as well as their arrow configuration adapted them well to high or even supersonic speeds.

In order that the invention may be more clearly understood, reference will now be made to the accompanying drawings of embodiments given purely by way of non-limiting examples, and in which:

FIGURE 3 is a cross-section of a blade of a rotor of an embodiment of an aerodyne according to the invention, and as shown in FIG. 4.

FIGURE 4 shows in perspective view an embodiment of a mechanical control for the flaps forming the leading and trailing edge of the blades shown diagrammatically in FIGS. 1 and 2;

FIGURES 5a and 5b show schematically the action of the cyclic pitch on the advancing and retreating having the structure shown in FIGS. 3 and 4;

FIGURES 6a and 6b show schematically the action of the general motion on the advancing and retreating blades of FIGS. 3 and 4 respectively.

Figure 1:
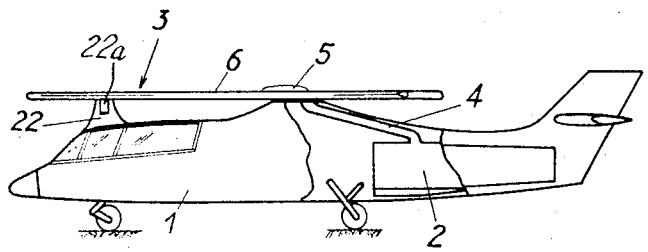
FIGURE 1 is a diagrammatic side elevation, with partial cutaway, of one embodiment of an aerodyne according to the invention.
Figure 2:
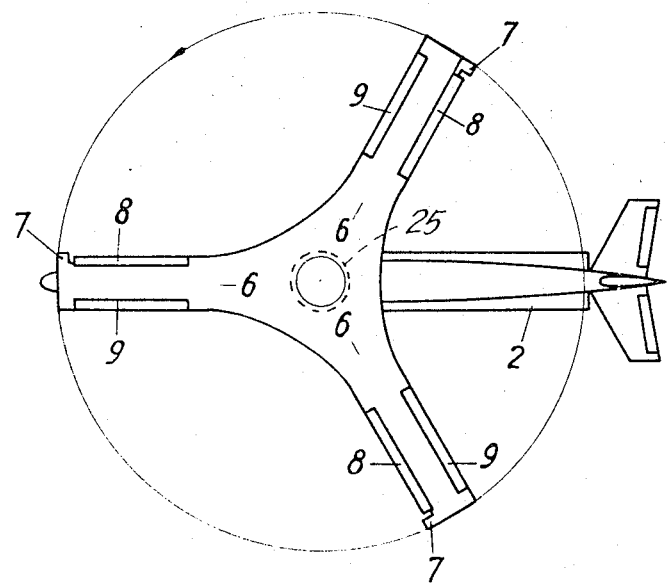
FIGURE 2 is a diagrammatic plan view of the embodiment shown in FIGURE 1.

The aerodyne according to the invention, shown in FIGURES 1 and 2, comprises a fuselage 1 and a propulsion unit 2, for example a double-flow or bypass jet turbine engine. On the other hand the machine is equipped with a rotor shown in a general way by 3, which is preferably capable of being driven by jet since this is the method of propulsion which provides the simplest solution, it being understood however that the invention is applicable to any principle used both for the propulsion of the rotor and for the propulsion of the machine. In the case of a double-flow jet, the primary flow of gases ejected towards the rear, provides a translation thrust to the machine whilst the secondary flow can be partially diverted, by a suitable system towards conduit 4 ending at the hub 5 of the rotor 3, this secondary flow constituted by the compressed air passing then along passages in the blades 6 to be ejected by the nozzles 7, located at the end of the blades.

The rotor is formed of rigid blades, preferably 3, and each having a symmetrical cross-section with respect to a vertical median plane through its longitudinal axis. Such a cross-section or profile, of lenticular shape, is represented in FIGURE 3. As shown each blade is equipped with a flap 8 on the trailing edge and a flap 9 on the leading edge. These flaps are hinged on a hollow spar 10, which serves as conduit for the gases passing to the nozzles 7. Each blade thus has an entirely symmetrical profile both the front and the rear of which can be used. The change in the direction of thrust necessary to compensate the gyroscopic torque of the rotor and for control in general, is done during the stage corresponding to helicopter flight, by modifying the position of the flaps 8 on the trailing edges of the blades by means to be described below. By this action, the curve of the profile of the blades, is changed, and consequently, also the thrust.

A modification of the angle of incidence of a blade of a helicopter rotor is well known to those skilled in the art of building and flying helicopters. Means of modifying the angle of incidence of a flap on a helicopter rotor equipped with flaps are similar in principle and application to means for modifying the angle of incidence of a helicopter rotor, and these means are not part of the present invention. Means which can be used for this purpose are disclosed for instance by Ryan et al. U.S. Patent No. 3,159,360, by Pullin et al. British Patent No. 646,865, by Young U.S. Patent No. 2,716,460, or by Dornier U.S. Patent No. 2,023,760. The following brief description of some of these means is given only as a necessary contribution to a full understanding of the invention.

According to the known state of the art, the flaps can be actuated either in squence or together. In one embodiment, the change of pitch is ensured by servomotors mounted on each blade of which the displacements are electronically controlled. Each servomotor can be controlled from a computer receiving information which corresponds on one hand to displacements of the controls (stick of the cyclic pitch and of the general pitch) and on the other hand, on the characteristics of the conditions comprising for example, the speed of rotor, the speed of translation, stresses of the blades, etc.

In a purely aeroplane flight, the flaps of the trailing edge of the arrow wing are actuated, which corresponds, taking account of the direction of rotation of the rotor, to a displacement of one of the flaps of the leading edge of a blade and of the flap of the trailing edge of the other blade.

In accordance with another feature of the invention, the displacements of the flaps, in the manner indicated above, can also suitably be controlled by swash plates.

It is a feature of the invention to actuate the leading edge flaps independently of the trailing edge flaps, in order that, in the first stage of the flight, whilst the rotor is acting as a helicopter rotor, flaps 8, all the trailing edge flaps, and flaps 9, all the leading edge flaps, be actuated accordingly, as will be explained in connection with the FIGURES 5a, 5b, 6a and 6b, whereas in the third stage of the flight, whilst the rotor is locked, both flaps of the blade pointing forward be actuated identically or not actuated at all whilst, on the blades pointing rearward at an angle of 120° with the direction of flight, flaps 8 and 9 be actuated as leading respectively trailing edge flaps on the one blade and conversely trailing respectively leading edge flaps on the other blade.

In accordance with this feature as indicated schematically in FIGURE 4 the displacement both of the trailing edge and of the leading edge of each blade is effected by a single swash plate 11. An axle 12 parallel to the hub of the rotor carries at its upper extremity, for each blade, an articulation 13, connected to a system of rods which comprises a crank-arm 14, hinged on a feeler 15 in contact with the swash plate 11. This crank-arm 14 actuates also a counter member 16, 17 causing a rod 18, connected to the flap of the trailing edge 8, to pivot.

On the other hand, a rod 19 connected to the flap of the leading edge 9, is hinged by means of a small crank-arm 20 on a feeler 21 in contact with the swash plate.

The connections which have just been described are precisely the same for the other blades of the rotor 1. The axle 12 can be displaced parallel to itself although the swash plate 11 can only undergo movements of inclination around a ball joint 12a secured to a fixed hub 12b without axial displacement.

A similar mechanism is well known for controlling the angle of incidence of blades of a helicopter rotor, and need not be described further. Suffice it to say that one control, the general pitch control, at the pilot's disposal allows a verical movement of axle 12 while another control, the cyclic pitch control, gives the possibility, by means of two conventional rods, to tilt the swash plate 11. When axle 12 is moved, say downwardly, the swash plate 11 does not move so that there is no action on rod 21, and flap 9 is not rotated; on the other hand, articulation 13 is moved downwardly and member 17 will rotate downwardly so that flap 8 will be inclined downwardly, as shown in FIGURE 6a for the advancing blade and in FIGURE 6b for the retreating blade.

If by means of the other control, the swash plate 11 is tilted as shown in FIGURE 4 and if the blade 6 shown is, for example, an advancing one, feeler 15 will climb, during rotation, on swash plate 11, while feeler 21 will go down. Therefore flap 9 will rotate downwardly and flap 8 will rotate upwardly, as shown in FIGURE 5a. Conversely, if the blade is a retreating one, the relative positions of the members will be reversed; for instance feeler 15' associated to a retreating blade will go downwards so that the corresponding flap 8 on a retreating blade will rotate downwardly while the corresponding flap 9 on a retreating blade will rotate upwardly, as shown in FIGURE 5b. In the example shown in FIGURE 4, the advancing blade lowers the front flap 9 and raises the rear flap 8 reducing the thrust, whilst on the retreating blade it is the reverse which is produced, leading thus to an increase in the thrust.

Taking into account the inertia of the blades, it is with a certain phase lag that the movement of the rotor or the torque on the fuselage is effected. It is noted at least that this movement of the flap could also serve in aeroplane flight. In fact this movement corresponds to a pitching manoeuvre, the two blades being affected by the same stream, as can easily be seen in comparing the FIGURES 5a and 5b, the direction of displacement of the aerodyne being that which corresponds to the arrow shown for the advancing blade.

In addition to the particular dispositions of which some embodiments have been given above, aerodynamic, means have been provided to ensure very efficient braking of the rotor enabling stoppage during flight. To this end a second nozzle 7a is provided in the end of each blades, normally obstructed and capable of being placed in communication with the interior of the blade, this second nozzle 7a being directed in the reverse direction to the nozzle 7. Of course, means permit the gases to be passed through this second nozzle, at the desired moment for braking, in order to reverse the thrust exerted by the gases escaping from the nozzle 7, for each of the blades. For example, a flap 7b can be provided so that in one position shown in the drawing, the auxiliary nozzle 7a is obstructed, while by pivoting said flap, the thrust is gradually reversed as a consequence of an increasing portion of the hot jets escaping through the nozzle 7a. A streamlined member could for example be also arranged having the profile of the blade upon which it could slide, this streamlined member being suitably cut off so that according to its position, it uncovers more or less one of the nozzles whilst masking more or less of the other. A very rapid braking can thus be effected so that the different resonance modes of the rotor are rapidly traversed. A mechanical friction brake 25, as shown in FIG. 2., advantageously completes this aerodynamic brake. Moreover, means easy to arrange by the engineer, for example a mechanical lock enables the rotor to be locked in the correct position, for example that which is shown in FIGURE 2 in the case of a triple rotor. Finally, it is preferable to provide in the fuselage a retractable or a non-retractable support 22, which in the course of aeroplane flight, is attached by mechanical or pneumatic means such as jack 22a, to the forward-pointing blade.

It will be understood that the described embodiments can undergo numerous modifications without departing from the scope of the present invention. Thus for example, with regard to the flaps of the leading and trailing edges, different solutions are possible. It is important however that each blade has a cross-section which is symmetrical with respect to a vertical plane through its longitudinal axis, this cross-section being arranged for the intended conditions of flight, subsonic, transonic, or supersonic. The slots which can be present between the flaps and the central spar of each blade can possibly be profitably used, for example to blow the boundary layers. On the other hand, to avoid an increased resistance, a flexible filling material 23 can be provided, such as foam rubber, in order to ensure the continuity of the profile.

Finally, for the one or more blades which are located along the axis of the aerodyne, when the rotor is locked, and which do not contribute to the lift of the machine, there can be provided a normally retracted streamlining in the fuselage which may be extended to integrate the one or more blades into the aerodynamic profile of the aerodyne. This or these blades could also be retracted into the fuselage.

We claim:

1. An aircraft of the type capable of flying at high speeds of translation and of vertical take-off, including a fuselage, at least one propulsion unit, a rotor formed of three rigid identical blades set at 120° to each other, each blade having a symmetrical profile with respect to a vertical plane through its longitudinal axis and being provided with a flap both at its leading and trailing edge, control means for independently actuating said flaps comprising a vertical shaft, a ball joint surrounding said shaft, a swash plate mounted on said ball joint to be actuated by control means at the pilot's disposal, feelers in contact with and activated by said swash plate, and a rod system connected to the flap of each blade and activated by said feelers, braking means for stopping the rotor in flight, and locking means for locking said braked rotor in a position in which one of said blades points forwardly above said fuselage and the two other blades extend at 120° thereto in the form of an arrow type wing.

2. An aircraft according to claim 1, wherein the outer end of each blade is provided with a first reaction jet nozzle facing in a direction opposite to the direction of rotation of the rotor for use in driving the rotor and with a second reaction jet nozzle facing in the direction of rotation of the rotor and comprising said braking means for stopping the rotor in flight.

3. An aircraft according to claim 2, including means located at the outer end of each blade for controlling the flow of jet fluid selectively to said nozzles to alternatively drive or brake the rotor.

4. An aircraft according to claim 3, wherein said control means comprises a streamlined member for selectively uncovering and masking said nozzles.

References Cited

UNITED STATES PATENTS

| | | | |
|---|---|---|---|
| 2,008,843 | 7/1935 | Smith | 244—6 |
| 2,023,760 | 12/1935 | Dornier | 170—160.1 |
| 2,486,672 | 11/1949 | Notestein | 170—135.75 |
| 2,600,715 | 6/1952 | Wheeler | 170—135.75 |
| 2,620,623 | 12/1952 | Imbert | 244—110 |
| 2,601,104 | 6/1952 | Douglas | 244—113 |
| 2,653,778 | 9/1953 | Bennett et al. | 244—6 |
| 2,716,460 | 8/1955 | Young | 170—160.1 |
| 2,743,072 | 4/1956 | Emmi | 244—6 |
| 2,964,263 | 12/1960 | Arena | 244—6 |
| 3,104,083 | 9/1963 | Kutzler | 244—42 |
| 3,146,970 | 9/1964 | Girard | 244—7 |
| 3,159,360 | 12/1964 | Ryan | 244—7 |
| 3,259,341 | 7/1966 | Steidl | 244—42 |
| 3,327,969 | 6/1967 | Head | 244—7 |

MILTON BUCHLER, *Primary Examiner.*

T. W. BUCKMAN, *Assistant Examiner.*

U.S. Cl. X.R.

170—135.71, 135.75, 160.1; 244—17.25, 123